United States Patent [19]

Steinberger

[11] 4,097,053
[45] Jun. 27, 1978

[54] HIGH SPEED POWER CHUCK

[75] Inventor: Joseph Steinberger, Dusseldorf, Germany

[73] Assignee: Paul Forkardt Kommanditgesellschaft, Germany

[21] Appl. No.: 777,961

[22] Filed: Mar. 16, 1977

[30] Foreign Application Priority Data

Apr. 30, 1976 Germany .................. 7613635[U]

[51] Int. Cl.² ............................................ B23B 31/16
[52] U.S. Cl. ................................. 279/1 C; 279/121
[58] Field of Search ................ 279/1 C, 4, 121, 110

[56] References Cited

U.S. PATENT DOCUMENTS

| 2,729,459 | 1/1956 | Leifer | 279/1 C |
| 3,424,468 | 1/1969 | Steinberger et al. | 279/121 |
| 4,009,888 | 3/1977 | Wallace | 279/1 C |

Primary Examiner—Gil Weidenfeld
Attorney, Agent, or Firm—Hill, Gross, Simpson, Van Santen, Steadman, Chiara & Simpson

[57] ABSTRACT

A counterbalanced power chuck such as may be used in association with power lathes is disclosed wherein each chuck jaw has a pivotable lever extending from a bore in the back face of the jaw through a stationary pivot section of the chuck body and into a bore in the opposing face of a radially movable weight. As chuck rotational speed increases, centrifugal force on the weight maintains jaw engagement pressure.

4 Claims, 2 Drawing Figures

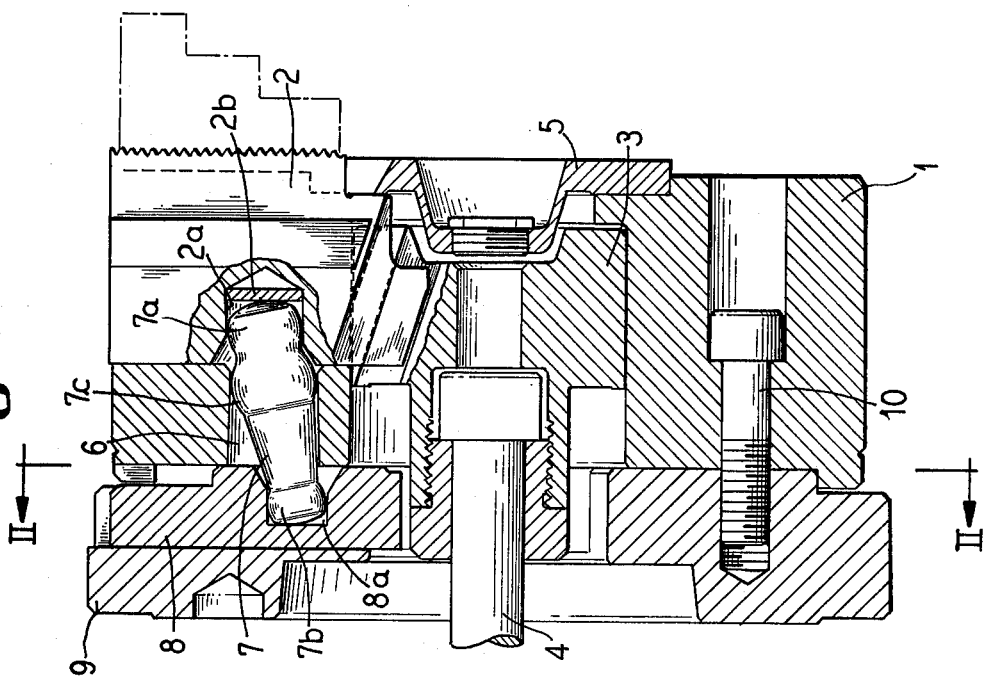
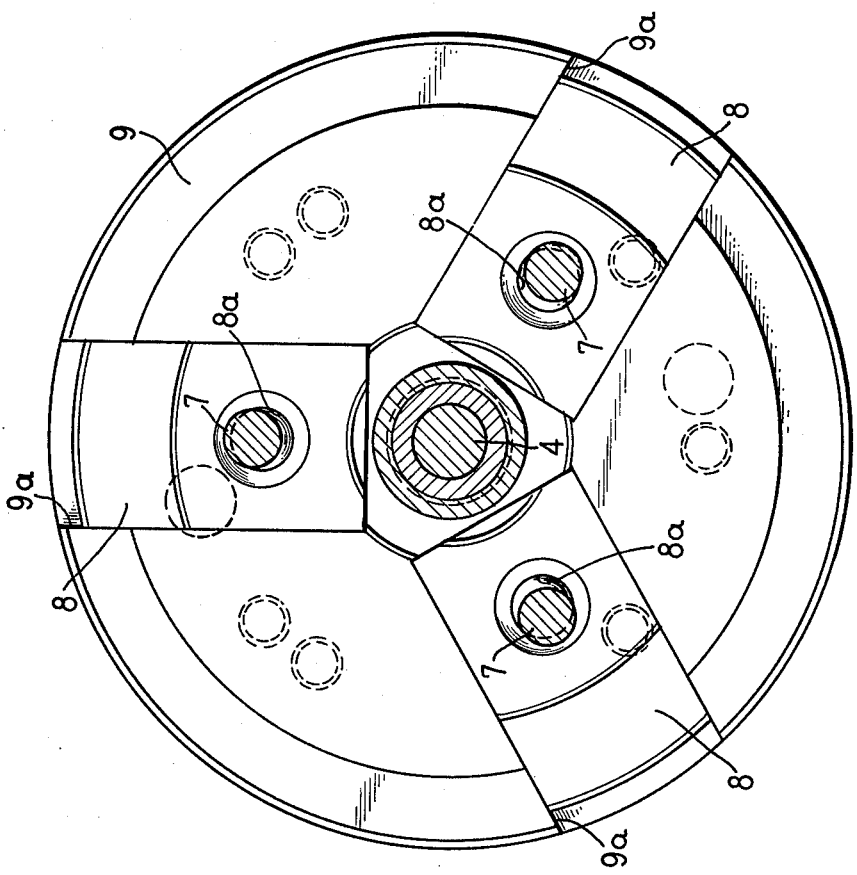

HIGH SPEED POWER CHUCK

BACKGROUND OF THE INVENTION

1. Field of the Invention

This invention relates to power operated chucks and more particularly to a counterbalanced chuck.

2. Prior Art

Power operated chucks for use in lathes and the like tools are known to the art. Such chucks include chucks having speed dependent variations in the chuck gripping force. The chuck gripping force may initially be produced by an axially aligned power member which rotates with the chuck and which transmitts movement and gripping force power to the chuck jaws by means of a tensioning device. The present invention is directed to such a device wherein the primary chuck gripping force member is augmented or compensated by means of a centrifugal weight assembly positioned outside of the chuck body to provide centrifugal balancing.

Power operated chucks having centrifugal balancing are well known in a number of specific designs. However such constructions are universally special designs created for special situations and have the resultant high manufacturing costs and sale prices.

It would therefore be an advance in the art to produce an inexpensive power chuck having centrifugal balancing, particularly one wherein the construction can be manufactured utilizing standard parts.

SUMMARY OF THE INVENTION

This invention provides a solution to the above problem by utilizing the chuck body of a standard type of commercial power chuck. The chuck is modified only in that a number of axial holes, corresponding in number to the number of chuck jaws, is provided in the chuck body and blind holes are provided in each of the chuck jaws. Each of the holes in the chuck and the jaws receives a solid two armed compensating lever. For purposes of this application, the lever disclosed is referred to as a two arm lever inasmuch as it has a central body portion with an extension on each side of the central body portion, each of the extensions acting as a lever arm with the fulcrum at the central body portion. On lever arm of each lever is received in the blind hole formed in a rear face of the associated chuck jaw and the other lever arm of each lever is received in a blind hole formed in a centrifugal weight housed in a radial slot of a chuck attachment flange in a manner allowing radial sliding of the weight. The central portion of the lever is received in a radially stationary member which in the disclosed embodiment is the chuck body.

Due to the simplicity of the invention, it is possible to modify standard commercial power chucks to provide centrifugal balancing. Such chucks, including those which utilize a centrally located chuck piston to control chuck jaw actuation and wherein a tension rod acting between a pressure cylinder and the chuck piston moves the chuck jaws can be easily modified. The modification merely involves adding to the existing chuck body a number of axial holes and providing blind holes in the rear face of the existing chuck jaws.

The added axial holes then receive the two armed compensating levers centrally therein. The front arm of each of the levers is received in a blind hole drilled in the rear of the associated chuck jaw and the rear arm of the lever is associated with and operates in combination with a centrifugal weight. The centrifugal weights slide in radial slots of a chuck attachment member. The attachment member or attachment flange is easily positioned between the commercial chuck body and the mounting flange of the machine tool spindle. Thus, it is possible in a simple manner to retrofit existing or to modify new chucks of a standard commercial type to provide centrifugal weights for the purpose of centrifugal balancing. In this manner the favorable price and cost features of standard production power chucks can be maintained while providing centrifugal balanced chucks.

As disclosed in the preferred embodiment illustrated, it is an additional feature of this invention to provide each of the levers with a bulbous central portion providing a bearing which is similar to a ball pivot. This bulbous bearing is received in the axial hole in the chuck body. In this manner special bearings for the levers are eliminated. Additionally, both ends of the lever arm may be provided with ball shapes with the front ball end received in the blind hole drilled in the rear of the associated chuck jaw and the rear ball end of the lever received in the blind hole drilled in the centrifugal weight. In this manner the ball ends received in the blind holes form bearing joints and no complex assembly is required to accomplish this. Assembly is accomplished by merely inserting the corresponding ends of the lever in the appropriate blind holes.

Because of the ease and simplicity of the construction and installation of the levers, it is possible to use levers wherein the axes of each of the lever arms of each lever will be in alignment. This allows manufacture of an inexpensive lever assembly which, in addition, is easily installed.

It is therefore an object of this invention to provide an inexpensive circumferential force compensating power chuck.

It is another and more particular object of this invention to provide a circumferential force compensating power chuck assembly which can be adapted to standard power chucks without requiring major modification thereof.

It is another, more specific object of this invention to provide a power operated chuck which is compensated for centrifugal force, the chuck including a chuck body having radially movable chucking jaw assemblies therein and a stationary body portion, axial holes through portions of the body portion, blind holes in the chuck jaw assemblies, radially movable weights on an opposite side of the chuck body from the jaws, the weights having blind holes therein, and straight lever members having ends received in the blind holes respectively of the chuck jaws and of the weights and a central bearing face received in the holes through the stationary portions of the chuck body whereby centrifugal force generated by rapid rotation of the chuck body will cause the weights to move radially outwardly thereby generating a force through the lever arms to urge the jaws radially inwardly.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary cross-sectional view of a power chuck modified according to this invention.

FIG. 2 is a sectional view taken along the lines II—II of FIG. 1 illustrating the centrifugal weights.

DESCRIPTION OF THE PREFERRED EMBODIMENTS

FIG. 1 illustrates a modification of a somewhat standard commercial power chuck. The chuck includes a chuck body 1 which has three circumferentially spaced chuck jaws on a front face thereof. The chuck jaws are housed in the chuck body and can move radially therein. As is common in the art, the chuck jaws consist of a base jaw shown at the top of FIG. 1 to which replaceable gripping jaw members are attachable. The chuck jaws are commonly actuated by a chuck piston 3 which may be fastened by means of a screw connection to a tension rod 4 which may be part of an axial power generator (not illustrated). As is known to those in the art, double acting hydraulic cylinders or the like are normally used to activate the tension rod. Such cylinders often rotate with the chuck. In order to prevent entry of dirt, shavings and the like, from the front face of the chuck to the interior thereof, the front opening is sealed with a cover plate 5.

Commercial chucks such as described above are readily available. The remaining portions, predominately in the bottom half of FIG. 1, represent modifications according to this invention.

Behind each chuck jaw 2, the chuck body 1 is provided with an axial bore 6 which may be beveled as illustrated. A two arm compensating lever 7 is centrally received through each of the bores 6. The lever includes front and rear lever arms 7a and 7b and a central bulbous portion 7c forming a bearing. The bearing portion 7c acts as a swivel mount in the manner of a ball pivot within a cylindrical or slightly tappered portion of the axial hole 6.

The front portion 7a of the lever arm is received in a blind hole 2a drilled into the rear of an associated chuck jaw 2. A bearing surface is likewise created in the blind hole 2a by means of a formation of a ball end on the front portion of the lever arm 7a. In order to assure positive axial positioning of the lever in the assembly, a stop member 2b may be installed at a predetermined depth in the blind hole 2a.

The rear portion of the lever arm 7b also terminates in a ball end. The rear portion 7b is received in a blind hole 8a of a centrifugal weight 8. The weight 8 slides in a radial slot 9a of a chuck attachment flange or member 9. The chuck attachment flange 9 is attached by means of bolts 10 to the rear face of the chuck body 1. The flange 9 can thereafter form a mounting flange for attachment of the entire chuck 2 to a machine tool spindle (not illustrated).

From the drawing, and the above description, it will be apparent to those skilled in the art that it is simple to modify a commercial chuck to provide the advantages of this invention by merely providing the chuck attachment 9, the centrifugal weights 8 and the compensating levers 7. The only modifications to existing commerical chucks are the provision of the axial hole 6 in the chuck body 1 and the blind holes 2a and the chuck jaws 2. With this minor modification pre-existing standard commercial power chucks can be converted to chucks having centrifugal balancing.

With the modifications of such chucks as shown in this invention, the centrifugal weights 8 will effect a centrifugal force to compensate the chuck jaws 2. The compensating levers 7 will transmit the centrifugal force of the weights 8 to a reverse force acting on the chuck jaws 2. In this manner a reduction of the chucking force which would otherwise be encountered with internal chucking will be compensated for. Conversely, an undesirable increase in the chuck force which can occur when external chucking is used will be equally countered.

This invention is such that the normal motion sequence of the chuck, and particularly the radial powered movement of the chuck jaws will not be impaired or otherwise interferred with. Additionally, when centrifugal counterbalancing is not required, the chuck body can be used as normal merely by removing the flange 9 and levers 7. The axial hole 6 and the blind holes 2a will not adversely effect the operation of such standard chucks.

Although the teachings of my invention have herein been discussed with reference to specific theories and embodiments, it is to be understood that these are by way of illustration only and that others may wish to utilize my invention in different designs or applications.

I claim as my invention:

1. In a commercial chuck for lathes having a chuck body with a rear face and a front face having a plurality of chuck jaws therein, the chuck jaws radially movable in the chuck body, chuck jaw movement control means including an axially movable member centrally received in the chuck body operatively connected with the chuck jaws, to radially move the same, the improvement of, in combination with the above, centrifugal balancing means including a plurality of axial holes through said chuck body open to a rear face of the chuck body, one of each holes aligned with one of the chuck jaws, blind holes in rear faces of the chuck jaws communicating with the axial holes in the chuck body, a plurality of radially movable centrifugal weights carried by a weight carrying flange member attached to the rear face of the chuck body the weights being radially movable with respect thereto, the centrifugal weights positioned on an opposite side of the axial bores from the chuck jaws, a plurality of compensating levers with one of said levers received in each of the axial bores and having opposed ends received respectively in the bores of the chuck jaw and the bores in an associated centrifugal weight, a central portion of each compensating lever forming a pivot within the axial bore whereby movement of one end of the compensating lever in a first radial direction will cause movement of the other end of the compensating lever in the opposite radial direction, the centrifugal balancing means being separate from and independent of the control means.

2. The device of claim 1 wherein a chuck attachment flange is bolted to a rear face of the chuck body on the opposite side of the chuck body from the front face, the flange having slide grooves therein, the centrifugal weights carried in said slide grooves for radial movement with respect to the flange.

3. A power chuck comprising a chuck body having axial front and rear faces, a plurality of substantially radially movable chuck jaws carried by the chuck body at the front face, a counterbalance assembly including (a) a plurality of axial bores through the chuck body, one of said bores aligned axially with each of said chuck jaws and open to the rear face of the chuck body, (b)

bores in a rear face of the chuck jaws communicating to the axial bores, (c) a separate weight carrying member attached to the rear face of the chuck body, (d) a plurality of radially moveable centrifugal weights carried by the member, the weights aligned with the axial bores, (e) bores in the weights communicating to the axial bores of the chuck body, (f) a compensating lever received in each of said axial bores having one lever end received in the bore of the weight and an opposite lever end received in the bore of the associated chuck jaw, a bulbous central section for said compensating lever engaging circumferential walls of the axial bore forming a ball pivot for said compensating lever; and chuck jaw movement control means for radially moving the chuck jaws to effectuate clamping, said means being separate and independent of the counterbalance assembly.

4. The device of claim 3 wherein the ends of the compensating levers are ball shaped and engage circumferential walls of the bores in the weights and jaws.

* * * * *